US007672106B1

(12) United States Patent
Sullivan

(10) Patent No.: US 7,672,106 B1
(45) Date of Patent: Mar. 2, 2010

(54) SWITCHING INCANDESCENT LAMPS AND OTHER VARIABLE RESISTANCE LOADS WITH A SOLID STATE, SMART, HIGH SIDE DRIVER HAVING OVERCURRENT AND TEMPERATURE SENSING PROTECTION CIRCUITS

(76) Inventor: James D. Sullivan, 3555 Africa Rd., Galena, OH (US) 43021

( * ) Notice: Subject to any disclaimer, the term of this patent is extended or adjusted under 35 U.S.C. 154(b) by 10 days.

(21) Appl. No.: 12/017,513

(22) Filed: Jan. 22, 2008

(51) Int. Cl.
*H02H 3/08* (2006.01)

(52) U.S. Cl. .................................................... 361/93.8

(58) Field of Classification Search ................ 361/93.8, 361/93.1, 91.9, 72, 101, 103
See application file for complete search history.

(56) References Cited

U.S. PATENT DOCUMENTS

| | | | | |
|---|---|---|---|---|
| 5,336,978 | A * | 8/1994 | Alessio | 315/169.3 |
| 6,520,279 | B2 * | 2/2003 | Fukumoto et al. | 180/446 |
| 6,580,219 | B1 * | 6/2003 | Jones et al. | 315/80 |
| 7,304,828 | B1 * | 12/2007 | Shvartsman | 361/93.1 |
| 2001/0024134 | A1 * | 9/2001 | Dubhashi et al. | 327/112 |
| 2001/0048367 | A1 * | 12/2001 | Wimmer et al. | 340/661 |
| 2002/0171985 | A1 * | 11/2002 | Duffy et al. | 361/90 |
| 2004/0120382 | A1 * | 6/2004 | Bennett et al. | 374/45 |
| 2004/0227476 | A1 * | 11/2004 | Guerra et al. | 318/254 |
| 2008/0262683 | A1 * | 10/2008 | Ward et al. | 701/51 |
| 2009/0002060 | A1 * | 1/2009 | Giandalia et al. | 327/534 |
| 2009/0080130 | A1 * | 3/2009 | Hein | 361/72 |

OTHER PUBLICATIONS

Y. Droinet, A Smart power Ic for High Side Driver Applications, 1991, IEEE, pp. 26-28.*
STMicrelectronics, Double Channel High Side Smart Power Solid State relay "VND10B", Jun. 2004, pp. 1-13.*
Inineon Technologies, Smart Highside High Current Power Switch, Oct. 2003, pp. 1-16.*
STMicroelectronics, Double 4mOhm High Side Drive With Analog Current Sense for Automotive Applications, VND5004A-E, Mar. 2006, 1/21-21/21, Revision 2.
STMicroelectronics, Double Channel High Side Solid State Relay, VND920, Jul. 2004, 1/20-20/20, Rev. 2.

* cited by examiner

*Primary Examiner*—Jared J Fureman
*Assistant Examiner*—Angela Brooks
(74) *Attorney, Agent, or Firm*—Frank H. Foster; Kremblas, Foster, Phillips & Pollick

(57) ABSTRACT

A circuit and method for controlling a smart, high side driver with current and temperature sensing so that it can turn ON a relatively high current load of incandescent lamps or similar loads within a practical time. The output of the high side driver is sensed. In response to the coexistence of an ON command applied to the control input of the high side driver and the output terminal of the high side driver switching to an OFF state, an OFF command is applied to the control input of the high side driver. That OFF command is maintained for a selected cooling time interval. An ON command is applied to the control input of the high side driver after the selected cooling time interval. The selected cooling time interval is at least long enough to allow the MOS/FET temperature to cool to the thermal reset of its status temperature $T_{RS}$, which is the temperature below which the driver operates with its highest current limit $I_{LIMH}$ when it is turned back on.

14 Claims, 6 Drawing Sheets

SWITCHING INCANDESCENT LAMPS AND OTHER VARIABLE RESISTANCE LOADS WITH A SOLID STATE, SMART, HIGH SIDE DRIVER HAVING OVERCURRENT AND TEMPERATURE SENSING PROTECTION CIRCUITS

CROSS-REFERENCES TO RELATED APPLICATIONS

Not Applicable

STATEMENT REGARDING FEDERALLY-SPONSORED RESEARCH AND DEVELOPMENT

Not Applicable

REFERENCE TO AN APPENDIX

Not Applicable

BACKGROUND OF THE INVENTION

1. Field of the Invention

This invention relates generally to electronic circuits for the controlled switching of high current loads and more particularly relates to controlling a solid state, smart, high side, high current, driver, that has internal current and temperature sensing, in a manner that it is enabled to switch incandescent lamps ON within a practical time interval.

2. Description of the Related Art

Convenient, energy efficient operation of electrical equipment, appliances and other electrical devices, such as flashers for periodically illuminating signaling or warning lights, often requires a switch for turning the device on and off. This is particularly important when multiple different devices are powered by a vehicle battery in order to minimize drain on the battery by permitting selected operation of only those devices that are currently being used. Some electrical devices are high power devices that draw large currents. For those, it is often desirable to control the switch that switches the high current from a low power electrical command signal. For this purpose, relays or power contactors were traditionally used. However, such devices have mechanical electrical contacts which are subject to corrosion and the possibility of having the contacts welded together and suffer from numerous other failure modes.

When solid state technology appeared, it was first applied to develop solid state switches that could be used for switching low currents associated with low power applications but the available solid state switching devices could not tolerate the higher currents of higher power loads. However, MOS/FET devices have more recently been developed that can switch currents on the order of a hundred amperes or more. These switching devices have thousands of MOS/FETs formed in an integrated circuit and connected in parallel so they each carry a small portion of the current and operate together as a high current, composite MOS/FET.

Additionally, modern integrated circuit technology also permits a variety of other circuits to be formed in the same integrated circuit to provide for operating, controlling and protecting the MOS/FETs. Because these associated circuits include digital logic and microcontrollers and include sensing circuits that can detect a variety of fault conditions and, in response to sensed conditions programmed into the digital control circuits, turn off the MOS/FETs in order to protect the integrated circuit module, the modules are called “smart”.

Consequently, the combination of the current switching MOS/FETs and their associated circuits provides high power switch modules that manufacturers can use to construct high power switches for applications in their field. In addition to the relatively high currents that each integrated circuit module can switch, manufacturers of high power switches can connect multiples of these integrated circuit modules in parallel to increase the maximum current their products can switch by a multiplier equal to the number of parallel modules. The use of these switching devices is increasing because there is no price differential between the older conventional contactors and the newer, smart, MOS/FET switches. A designer chooses the switches with the lowest drain to source resistance, $R_{DS\ ON}$ or $R_{DS}$, because they give the lowest heat dissipation in the MOS/FETs.

A particularly useful type of power switching module is a smart, high side, high current driver. High side means that the power switching terminals are connected between the high side of the power source, such as the positive terminal of a battery, and the load being switched. The second terminal of the load is connected to a common power circuit ground. Such drivers also provide a terminal connected to an additional MOS/FET source which is part of a current mirror circuit that provides a current signal to an external circuit that is proportional to the load current. There are a few manufacturers who supply such modules such as a PROFET® BTS555 offered by Infineon Technologies. This first generation high current power switch module was designed to control a starting motor on a vehicle.

The next step in the evolution of the high power MOS/FET high side drivers was current limiting. An additional MOS/FET source is used for an additional current minor to provide a sensed current signal to the internal control circuitry of the high side driver that is proportional to the load current. Such high side drivers have a digital logic control input that can be controlled by external logic circuitry, such as a microcontroller, which commands the driver to an ON state or an OFF state. The internal control circuits and the high current switching MOS/FETs can be on one integrated circuit or, more commonly, on multiple integrated circuits that are wired together. The high side driver is permanently grounded and power is permanently applied to it to power its control circuitry. Consequently, the internal control circuit of such high side drivers is able to continuously sense the output load current and modulate the load current by varying the gate voltage including switching OFF the load current by clamping the gate to zero in response to detected fault conditions.

In addition to current sensing and current limiting, the second generation high side drivers also have temperature sensors that have an output connected to their internal control circuit for sensing the temperature of the MOS/FETs and controlling the load current. Consequently, their control circuits are able to modulate or turn OFF the load current as a function of this temperature and thereby also protect the high side driver from excessive temperatures.

An example of a prior art high side driver is a VND5004-E sold by STMicroelectronics. This driver has a minimum 4 milliohms $R_{DS\ ON}$ and its circuit is illustrated in FIG. 2. The VND5004-E driver has two current switching circuits for independently controlling two loads, although for some applications the two are advantageously connected in parallel to distribute the current between them and allow twice the maximum current of each. Each switching circuit includes two composite MOS/FETs 10 and 12 and several associated control circuits for operating, controlling and protecting the MOS/FETs. The control circuits include a logic circuit 14, such as a microcontroller or other digital logic circuit, programmed with suitable instructions for performing the control processes. The operating, controlling and protecting circuits include circuits for sensing load current and MOS/FET temperature as well as other circuits but they are not described in detail because they are a part of the prior art and are described in the manufacturer's specifications.

High side drivers of this type also have terminals for connecting the driver to external circuitry. The VND5004-E driver has outputs 16 and 18, one for each of its two switching circuits, for connection to separate loads or the same load. It also has control inputs 20 and 22 for respectively controlling each of the high current, composite MOS/FETs 10 and 12. The other terminal of a load is connected to the power circuit ground. The power source, such as a 12 or 24 volt vehicle battery, is connected to a battery terminal 24 and the other power source terminal 26 is connected to the power circuit ground. The VND5004-E driver has a pair of sensing or diagnostic terminals 28 and 30 which are outputs of internal current minor circuits. Each diagnostic terminal provides an output current that is proportional to the load current through its associated composite MOS/FET 10 and 12 respectively. Another current minor circuit for each MOS/FET is used for sensing the same output load currents but provides its output signal to the internal logic of the high side driver. Each current mirror circuit utilizes a few of the large number of individual MOS/FETs formed in the integrated circuit of the high side driver. A current minor circuit is well known in the art and, as applied to the drivers, the drains of all the individual MOS/FETs are connected together and most of the sources of the individual MOS/FETs are connected to the main output load terminal 16 or 18 for switching the high load current. A few of the sources, however, are instead used for the current minor circuits and connected to the sensing terminals 28 and 30 or to provide the internal feedback load current signal. As known in the art, a current mirror circuit provides a current that is proportional to the load current through the majority of MOS/FETs that conduct the load current through the driver.

The operation of the VND5004-E driver provides an example of the operation of the second generation drivers. The internal logic control circuits provide generally the following protective functions. In the event that the internal current sensor detects an overload current that exceeds a selected maximum current limit $I_{LIMH}$, such as 100 amps for example, the internal control logic decreases the voltage applied to the MOS/FET gates to maintain the current at the maximum limit. Unfortunately, this increases the drain to source resistance $R_{DS}$ which results in more heat dissipation in the MOS/FETs. Because the current equals the applied source voltage divided by the sum of the load resistance and the drain-source resistance $R_{DS}$, in order to limit the current to a fixed current limit, the less the resistance of the load, the greater must be the drain-source resistance RIDS. Therefore, when the driver is operating at a particular current limit, the less the resistance of the load, the greater the heat dissipation in the MOS/FETs.

Because the internal control circuit of the driver also senses MOS/FET temperature, in the event that the sensed temperature exceeds a maximum temperature $T_{TSD}$, the internal control logic shorts the MOS/FET gate to ground and thereby opens the MOS/FETs to a non-conductive, high resistance state. Consequently, if a MOS/FET gets too hot, the high side driver is shut down by its own associated, internal control circuitry before the driver is damaged.

Additionally, the second generation drivers are programmed to turn the MOS/FETs back on after their temperature drops to an intermediate temperature TR as a result of heat transfer by conduction from the MOS/FETs through heat sinks and into the surrounding environment. However, under the described conditions, the MOS/FETs are turned back on at a reduced maximum current limit ILIML, such as 40 amps, for example. Thereafter, if the MOS/FET temperature again rises to the maximum temperature TTSD, the MOS/FETs are again shut down to a non-conductive, high resistance state to stop all current flow. Then, when the temperature again falls below the intermediate temperature TR the MOS/FETs are again turned on but again at the reduced maximum current limit ILIML. This operation then repeats unless and until the temperature sensors detect that the MOS/FETs have cooled to a lower temperature TRS. This reduced current limit is imposed by reducing the MOS/FET gate voltage which, as previously mentioned, results in an increased drain to source resistance RDS and more dissipation of electrical energy as heat in the MOS/FET. This increased drain to source resistance RDS is greater than the specified minimum drain to source resistance, such as the 0.004 ohms described above, and therefore dissipates more heat in the MOS/FETs than would an RDS equal to the minimum RDS.

There is an important reason that the high side driver is programmed to limit the current to a lower current limit $I_{LIML}$ following the detection of an excessive temperature above the shut down temperature $T_{TSD}$. In order to optimize the usefulness of the driver, it is desirable to have the broadest range of normal operating conditions; i.e. the highest current limit and the highest permissible temperature of operation. However, silicon is brittle and if repeatedly cycled between wide temperature extremes, it will eventually be damaged (e.g. crystal fracture) and become inoperable. The larger the temperature differential over which the device cycles, the shorter the lifetime of the device. In order to maximize the current limitation, the internal control circuit of the driver initially turns the driver ON at its maximum current limit $I_{LIMH}$. The internal control circuit turns it OFF if the temperature reaches the maximum temperature $T_{TSD}$. However, the driver control circuit thereafter allows it to cool to an intermediate temperature $T_R$ but then limits its load current to a lower current limit $I_{LIML}$ in order to protect the driver. Consequently, the temperature algorithm used by the internal control circuit has multiple temperature levels so the MOS/FETs will cycle between two, not so extreme temperatures after its temperature has exceeded its maximum temperature $T_{TSD}$. So, in summary, in order to get the broadest range of operating characteristics, the device first applies its highest current limit $I_{LIMH}$, such as the 100 amp current limit of the VND5004A-E, which, under most and/or normal conditions will not be exceeded or cause an overtemperature. However, once the control circuit of the driver turns the driver OFF as a result of an excessive temperature, it then goes to a much lower current limit and turns the driver back ON when the MOS/FET temperature falls to an intermediate level in order to prevent cycling between excessive temperature extremes so as to reduce the mechanical stress on the silicon device.

If the driver is controlling the current through any fixed impedance load, the above-described operation works fine. If a dead short is applied to the load terminals, the internal control circuit switches the load OFF and also protects driver because there are no excessive currents.

However, there is a problem when a high side driver having this control algorithm is applied to controlling the current through incandescent lamps, such as, for example, the incandescent lamps on a motor vehicle. Some motor vehicles have large numbers of incandescent lamps, particularly emergency vehicles, such as ambulances, emergency medical service vehicles or fire trucks. Not only do they often have a large number of lamps, but they also have high power, high light intensity lamps. Such emergency motor vehicles typically are equipped with many exterior lamps for signaling the presence of the vehicle, interior lamps for lighting their interior work areas and lamps for illuminating areas outside and around the vehicle. One example of a switching module that advantageously uses a smart, high side driver is a flasher for the exterior signal lights of an emergency motor vehicle. Its function is to turn the lights ON and OFF in a periodic manner to increase the visibility of the vehicle and heighten the awareness of its presence and movement by nearby motorists. The problem is that the second generation, smart, high side drivers of the type described are unable to turn on many of the incandescent lamp loads presented by such vehicles within a useful time interval. For example, for some banks of lamps, the incandescent lamps may take on the order of a minute to be turned on by the driver. For some lamps with an even higher power demand, the lamps can never be turned on by the high side driver using the above-described control algorithm.

It is therefore an object and feature of the invention to provide a circuit and a method of operating smart, high side drivers of the type described so that the drivers are able to turn on loads that include incandescent lamps (or other electrical loads that have a similar characteristic) that interact with the high side driver to prevent the driver from turning on the load within an acceptable and practical time interval.

BRIEF SUMMARY OF THE INVENTION

In briefest summary, the invention is a circuit and method for controlling the high side driver by (1) sensing the driver's output state, (2) applying an OFF command to the driver's control input following shut down of the high side driver by its own internal control circuit as a result of the sensed MOS/FET temperature reaching its shutdown temperature $T_{TSD}$, (3) holding the driver OFF to force an extended cool down for a selected cooling time interval, and (4) then applying an ON command to the driver's control input. The selected cooling time interval is empirically determined for each high side driver model and is at least sufficient to allow the MOS/FET temperature to cool to its thermal reset status temperature $T_{RS}$ which is the temperature below which the driver operates with its highest current limit kiwi when it is turned back ON by an ON command at its control input. This avoids the programmed pattern of switching ON/OFF at the lower current limit $I_{LIML}$.

The method of the invention is a method for controlling a solid state, smart, high side driver for controlling the application of electrical power from a DC electrical source to a load when the load has a transient characteristic that the load increases in electrical impedance following the application of power to the load. The high side driver has overcurrent and driver temperature sensing and protection circuits, a control input terminal for applying an ON state or an OFF state command to the high side driver and a power output terminal for connection to the electrical load. The method of the invention comprises:

(a) sensing the output terminal of the high side driver for detecting that the high side driver has turned to an OFF state; and (b) in response to the coexistence of an ON command applied to the control input of the high side driver and the output terminal of the high side driver switching to an OFF state, applying an OFF command to the control input of the high side driver, maintaining the OFF command at the control input of the high side driver for a selected cooling time interval, and applying an ON command to the control input of the high side driver after the selected cooling time interval.

The apparatus of the invention is an electronic switch for controlling the application of electrical power from a DC electrical source to a load, the load having a transient characteristic that the load increases in electrical resistance following the application of power to the load. The electronic switch comprises:

(a) a solid state, smart, high side driver having overcurrent and driver temperature sensing and protection circuits, a control input terminal for applying an ON state command or an OFF state command and a power output terminal for connection to the electrical load, the high side driver including an internal control circuit having stored instructions causing the driver (i) in response to an ON command continuously applied to its control input, to switch to an ON state at a higher current limit $I_{LIMH}$ if the driver's sensed temperature does not exceed a lower, reset status temperature $T_{RS}$, (ii) in the absence of an OFF command, to protectively switch to an OFF state if its sensed temperature exceeds a thermal shutdown temperature $T_{TSD}$, and (iii) in the absence of an OFF command, to switch to an ON state at a lower current limit $I_{LIML}$ if its temperature falls from the thermal shutdown temperature $T_{TSD}$ to an intermediate reset temperature $T_R$; and (b) a solid state, digital logic, control circuit externally of the high side driver and having at least one external control input for application of an OFF command or an ON command, an output connected to the control input of the high side driver and an input connected to the power output terminal of the high side driver for sensing the ON and OFF state of the output of the high side driver, the external digital controller having stored instructions causing the external controller, in the absence of an OFF command at the external control input, (i) to apply an OFF command to the input terminal of the high side driver in response to sensing that the high side driver has turned to an OFF state, (ii) to maintain the OFF command at the input terminal of the high side driver for a selected cooling time interval, and (iii) to apply an ON command to the input terminal of the high side driver after the selected time interval.

Figure 1:
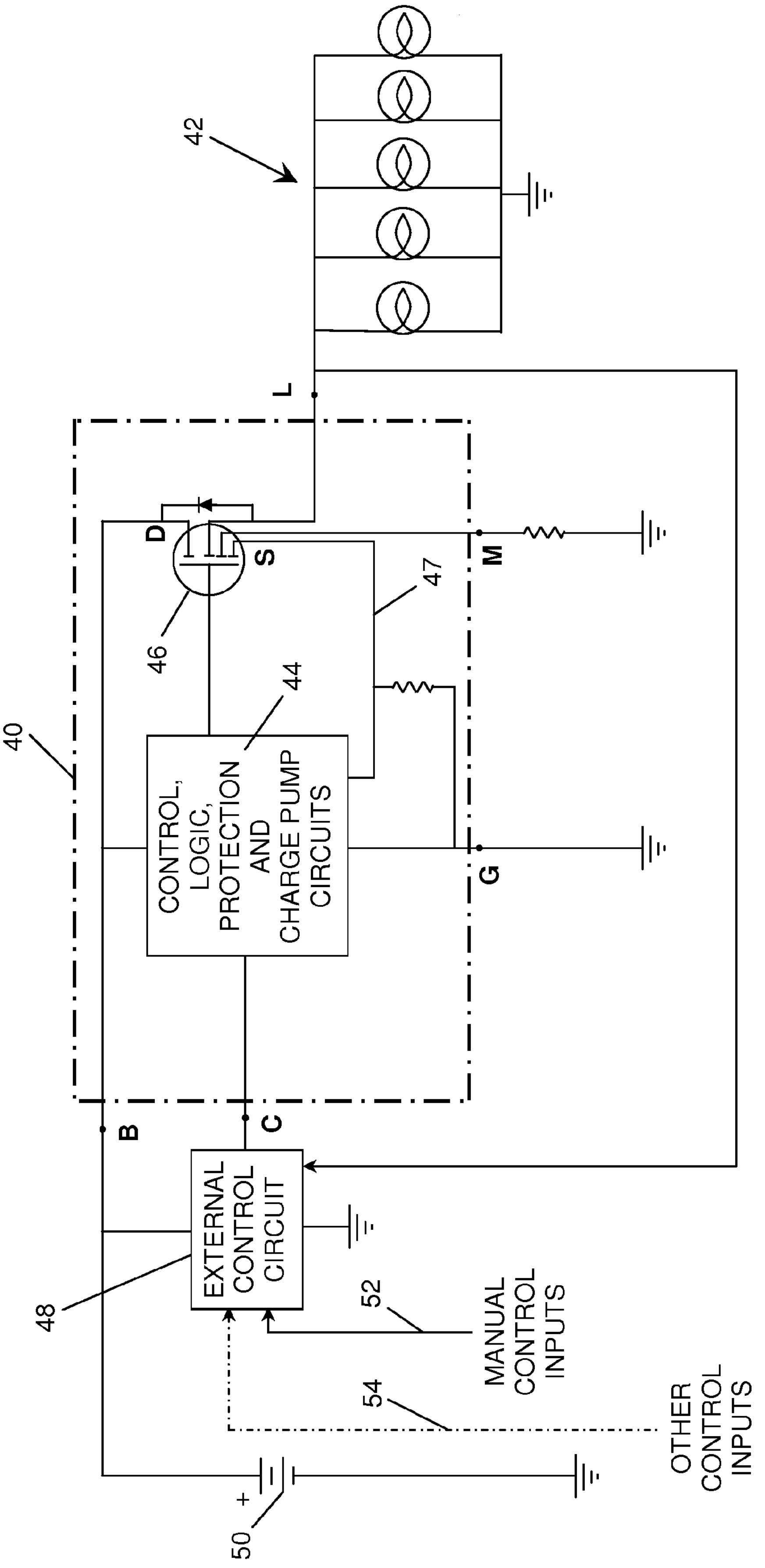
FIG. 1 is a block diagram of the preferred embodiment of the invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other circuit elements where such connection is recognized as being equivalent by those skilled in the art. In addition, many circuits are illustrated which are of a type which perform well known operations on electronic signals. Those skilled in the art will recognize that there are many, and in the future may be additional, alternative circuits which are recognized as equivalent because they provide the same operations on the signals.

DETAILED DESCRIPTION OF THE INVENTION

Figure 4:
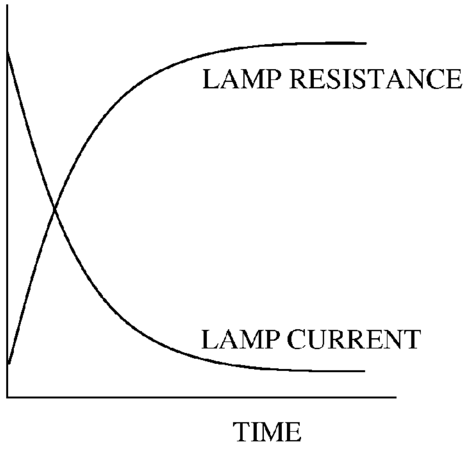
FIG. 4 is a graph illustrating the variation in the resistance and the current through an incandescent lamp as a function of time.

I have found that the high side driver is unable to turn on incandescent lamps within a practical time interval, if the lamps have a significant power demand, because of an interaction between a particular electrical characteristic of incandescent lamps, or other loads having the same characteristic, and the above-described control algorithm or programmed process for protecting the high side driver. This characteristic of incandescent lamps is illustrated in FIG. 4. At the instant that electrical power is first applied to an incandescent lamp, its filament is relatively cold and therefore has a relatively low resistance. This low resistance results in a high initial inrush current through the lamp that begins heating the filament. In ordinary operation, as the filament heats up from the current passing through it, the temperature increase causes the electrical resistance of the filament to increase. As the electrical resistance increases, the current decreases. As the lamp makes the transition from its OFF state to its ON steady state, the resistance may increase, for example, by a factor of 10 or 20 and therefore the electrical current may decrease by a factor of 10 or 20.

From that characteristic it is easy to see that a lamp or a connected set of lamps can have a steady state operating current that is lower than the maximum current limit $I_{LIMH}$ of a high side driver MOS/FET, but have an initial inrush current, in the absence of current limiting, that not only exceeds that current limit $I_{LIMH}$, but also quickly causes the driver to overheat and be shut down by its internal control circuit. For example, a set of lamps that have a normal operating current of 50 amps and are driven by a high side driver with a 100 amp higher current limit $I_{LIMH}$, might have an initial inrush current of 500 or 1000 amps. Although the response of a high side driver of the type described above will be described in more detail below, this extraordinarily high current may typically cause the MOS/FETs to reach their maximum shut down temperature $T_{TSD}$ within, for example, 1 to 5 milliseconds and be shut down by the internal control circuit. At that point the lamps have not been heated significantly, their resistance will not have increased significantly, and therefore, when power is next applied to the lamps, the inrush current would not be much less than the first inrush current, except for current limiting imposed by the driver. When the MOS/FETs are again turned ON but with the lower current limit $I_{LIML}$ and higher drain-source resistance $R_{DS}$, as described above, the lower current limit results in less heating power being applied to heat the lamps, the MOS/FETs will soon again reach the maximum shut down temperature $T_{TSD}$ and the MOS/FETs will again be shut down. The result is that, when the incandescent lamps are switched by a high side driver of the typed described, the lamps are powered by an initial current pulse at the higher current limit $I_{LIMH}$ followed by a series of current pulses at the lower current limit $I_{LIML}$.

That series of current pulses applied to the incandescent lamps produces one of multiple results. If the initial inrush current is less than the maximum current limit $I_{LIMH}$, the lamps will come on normally and the invention is unnecessary. If the initial inrush current exceeds the maximum current limit $I_{LIMH}$ AND enough power is dissipated in the lamp filaments from each current pulse to replace the heat lost by the filaments between the pulses and to additionally heat the filaments further, then the filaments will eventually be heated to a sufficiently high temperature and high resistance that the current becomes low enough that the driver can, eventually, continuously power the lamps. Unfortunately, the length of time required is often too long for practical use. For example a vehicle light flasher that requires a minute to turn the lamps fully on is of no practical value. Furthermore, if the initial inrush current exceeds the maximum current limit $I_{LIMH}$ AND enough power is NOT dissipated in the lamp filaments from each current pulse at the lower current limit $I_{LIML}$ to replace the heat lost by the filaments between the pulses and also heat the filaments further, then the filaments will never be heated to a sufficiently high temperature and resistance that the driver can continuously power the lamps. The lamps are never illuminated.

Incandescent lamps are not the only type of electrical load that exhibits this problematic characteristic that is illustrated in FIG. 4 and therefore would cause the same type of response by the high side driver. A capacitor being charged from a DC source also exhibits this characteristic. Therefore, a load that has a high capacitive reactance can also be advantageously driven by a high side driver that is controlled in accordance with the invention.

Figure 2:
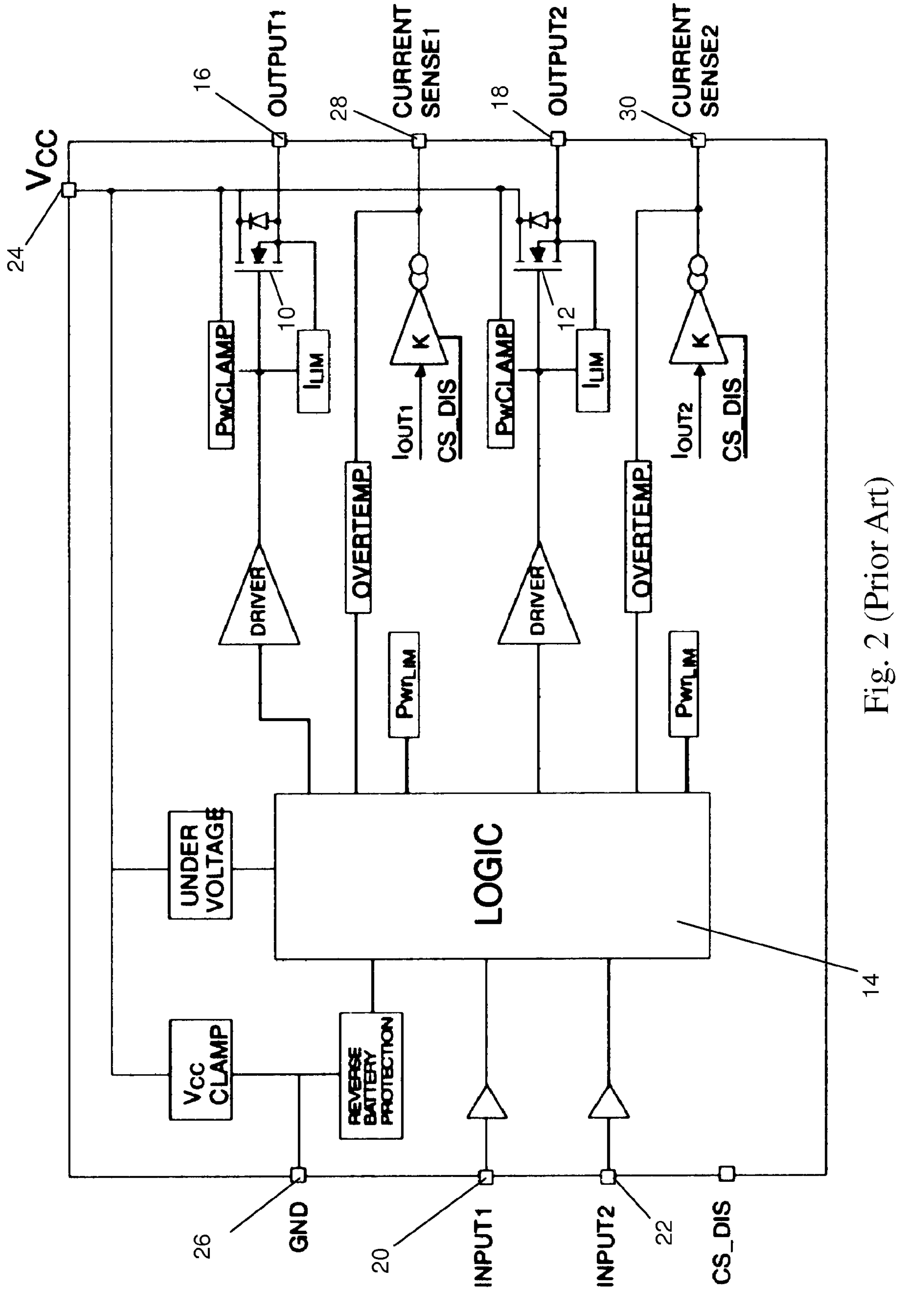
Fig. 2 (Prior Art)
FIG. 2 is a block diagram of a prior art smart, high side driver.

FIG. 1 illustrates a switching module embodying the present invention. The switching module uses a high side driver 40, such as the driver illustrated in FIG. 2, for switching a bank of incandescent lamps 42 or other loads having the same characteristic. For simplicity of illustration, the control and protection circuits 44 of the prior art driver illustrated in FIG. 2 are lumped together and control a composite MOS/FET 46. One MOS/FET 46 is illustrated to simplify the description. A load current output terminal L is connected to the lamps 42, a battery 50 is connected to a power input terminal B and the driver 40 is grounded at a terminal G. A source of the MOS/FET 46 is connected to a current sensing terminal M to form a current mirror that provides an output current proportional to the load current for external use. Another source of the MOS/FET 46 provides a current feedback signal through a conductor 47 which is part of another current minor.

The high side driver 40 of the switching module also has an external control circuit 48 for controlling the driver 40 in a way that takes advantage of the high current and protective capabilities of the high side driver, but also controls the driver in a way that allows the driver to heat up the lamps to a steady state temperature and full illumination intensity in considerably less time than the driver 40 alone is able to do. An output of the external control circuit 48 is connected to the control input C of the driver 40. The external control circuit 48 has conventional manual inputs 52 for human control of the lamps and may also have other inputs 54 from other circuits. As known to those skilled in the art, these inputs can have a variety of intermediate circuits and devices upstream of the external control circuit 48.

Figure 3:
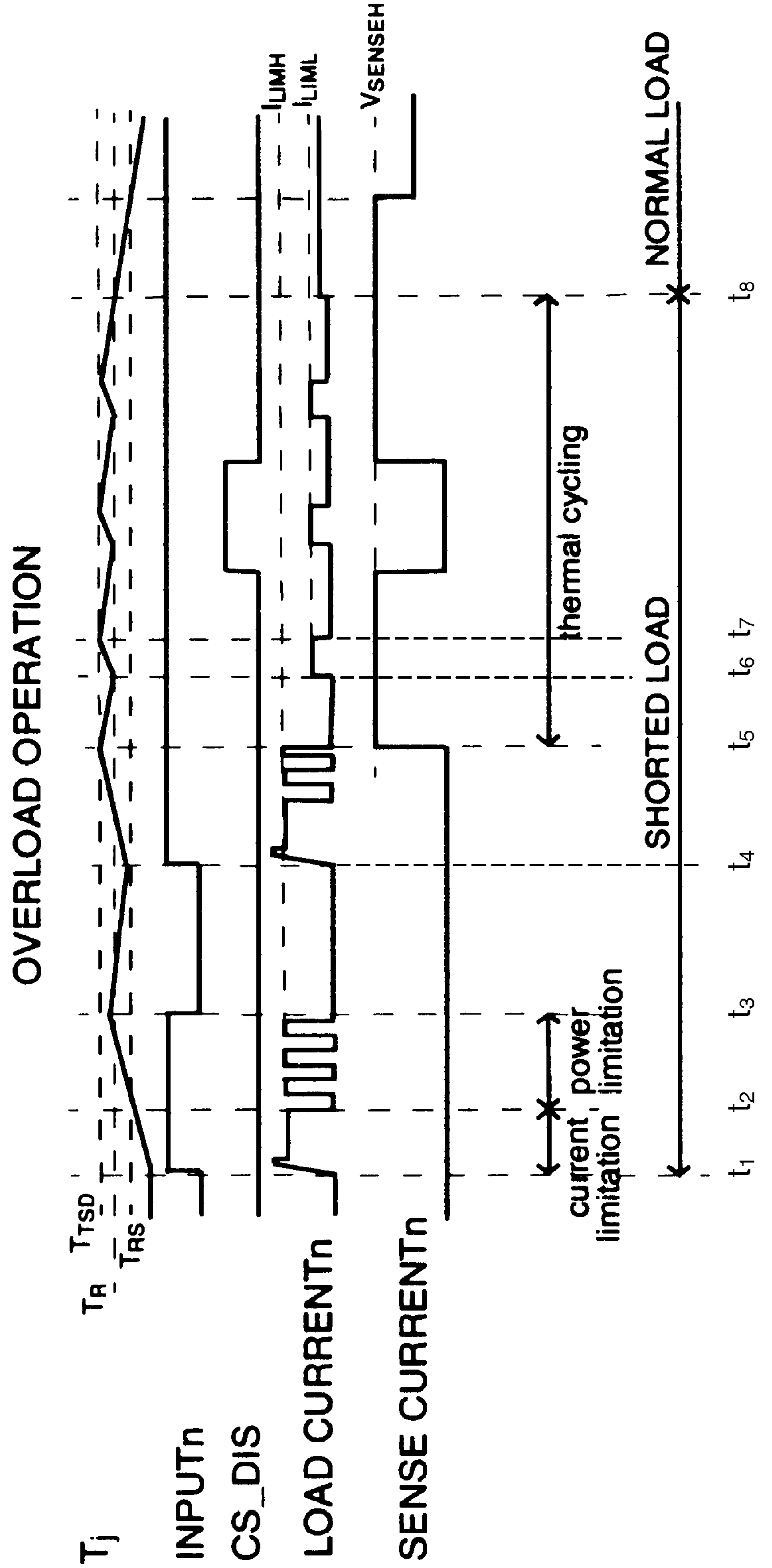
Fig. 3 (Prior Art)
FIG. 3 is an associated set of oscillograms illustrating the operation of the high side driver of FIG. 2.

FIG. 3 is a prior art graph from the manufacturer of the VND5004-E driver (except for the indicated times) and illustrates its overload modes of operation when the driver 40 is connected to a load that causes the load current to exceed the maximum current limit $I_{LIMH}$. FIG. 3 shows that the internal control circuit of the driver 40 responds to the sensed MOS/FET temperature $T_J$ when it reaches one of three levels, $T_{TSD}$, $T_R$ and $T_{RS}$, for the reasons described above. At time $t_1$, upon application of an ON command at an appropriate logic level to the control input of the driver 40 and with the junction temperature below $T_{RS}$, the driver is turned ON at its higher current limit $I_{LIMH}$, for example 100 amps. If, at time $t_3$, an OFF command is applied to the control input of the driver 40, the driver 40 is turned OFF and load current ceases.

FIG. 3 shows, between times $t_2$ and $t_3$, the load current being switched alternately ON and OFF at its high current limit $I_{LIMH}$ if the MOS/FET temperature reaches the intermediate temperature $T_R$. This operation is labeled a power limitation mode Although I did not observe this mode, whether or not the pulses of this power limitation mode occur, the invention, its operation, and the interaction of the driver 40 with the incandescent load 42 are not different in any significant manner.

As also illustrated in FIG. 3 between times $t_4$ and $t_5$, upon application of an ON command to the control input C of the driver 40 at time $t_4$, the driver switches ON and supplies current at the maximum current limit $I_{LIMH}$. When the MOS/FET temperature $T_J$ reaches the shut down temperature $T_{TSD}$, at time $t_5$, the driver is shut down and the load current is turned OFF. From times $t_5$ to $t_6$, the MOS/FET temperature $T_J$ declines as heat is conducted away. When the MOS/FET temperature $T_J$ falls to the intermediate temperature $T_R$ at $t_6$, the driver 40 switches ON again but this time at its lower current limit $T_{LIML}$. When the temperature $T_J$ again rises to $T_{TSD}$, at $t_7$, the driver 40 is again shut off. As long as the control input C of the driver 40 is commanded ON, the current pulses at the lower current limit $T_{LIML}$ continue to be applied to the load as the temperature $T_J$ oscillates between temperatures $T_R$ and $T_{TSD}$. So long as the lamp filament does not become sufficiently hot that the current overload is eliminated, the MOS/FETs remain hot, oscillating between temperatures $T_R$ and $T_{TSD}$, the lamps are not illuminated and the device never returns to its higher current limit $I_{LIMH}$.

As is apparent to those skilled in the art, the energy applied to the lamps for heating the filaments is proportional to the area under the load current pulses. Looking at the current pulses in FIG. 3 between $t_5$ and $t_8$, it can be seen that those current pulses are so short and widely spaced, that the rate of applying the heat energy, i.e. the power, applied to the lamps is relatively low. That is why the lamps come on too slowly or not at all.

In the conventional control of the high side driver, the control input of the high side driver is simply commanded ON or OFF to turn the driver ON or OFF as the load is intended to be ON or OFF. This results in the inability of the high side driver to turn on high power incandescent loads for the reasons explained above. However, because the power source is continuously powering the control circuitry of the driver 40, its control input can be switched and its internal circuitry will respond regardless of whether the driver 40 is in an ON state or an OFF state.

The invention uses this opportunity by modulating the control input of the high side driver while the incandescent lamps are being warmed up. The invention forces a cool down time interval whenever the driver is shut down as a result of its temperature rising to $T_{TSD}$. This cooling time interval is made long enough to avoid the switching and oscillating of the driver between its ON and OFF states at the low current $I_{LIML}$ as illustrated between times $t_5$ and $t_8$ in FIG. 3. The driver's control input C is modulated by initially switching the driver 40 ON so that is applies the 100 amp pulse. If and whenever the driver is switched OFF by its internal control circuit because the MOS/FETs have reached temperature $T_{TSD}$, the external control circuit commands the driver 40 OFF. The external control maintains that OFF command for a cooling time interval. After expiration of the cooling time interval, the external control circuit then commands the driver back ON. The length of the cooling time interval is at least long enough to permit the driver to cool sufficiently that is turns ON at its higher current limit $I_{LIMH}$. Therefore, the driver applies the next current pulse to the incandescent load at the higher current limit $I_{LIMH}$. That sequence is repeated so that all current pulses applied to the load are at the higher current limit $I_{LIMH}$ until finally, the incandescent lamps are heated sufficiently that the load current is reduced sufficiently that the driver does not turn off from overheating. The result is that the MOS/FETs stays cooler and the lamps are illuminated more quickly.

The apparatus of the invention uses a high side driver of the type described and that is programmed so that, in response to an ON command continuously applied to the driver's control input, the driver switches to an ON state at a higher current limit $I_{LIMH}$ if the driver's sensed temperature does not exceed a lower, reset status temperature $T_{RS}$, the driver switches to an OFF state if its sensed temperature exceeds a thermal shutdown temperature $T_{TSD}$, and the driver switches to an ON state at a lower current limit $I_{LIML}$ if its temperature falls from the thermal shutdown temperature $T_{TSD}$ to an intermediate temperature $T_R$.

Describing the method in more detail, the invention is a method for controlling a solid state, smart, high side driver for controlling the application of electrical power from a DC electrical source to a load when the load has a transient characteristic that the load increases in electrical impedance following the application of power to the load. The high side driver used with the method has overcurrent and temperature sensing and protection circuits, a control input terminal for applying an ON state or an OFF state command to the high side driver and a power output terminal for connection to the electrical load.

The output terminal of the high side driver is sensed continuously for detecting when the high side driver has turned to an OFF state. The external control circuit of the switching module controls the high side driver and therefore has stored information on the state of the ON or OFF state of the digital command applied to the control input of the high side driver.

In response to the coexistence of an ON command applied to the control input of the high side driver and the output terminal of the high side driver switching to an OFF state, an OFF command is applied to the control input of the high side driver. This OFF command is maintained at the control input of the high side driver for a selected cooling time interval. An ON command is applied to the control input of the high side driver after the selected cooling time interval.

The method more specifically comprises maintaining the OFF command at the control input of the high side driver for a selected cooling time interval that is at least as long as a heat dissipation time required for the sensed temperature of the driver, while in an OFF state, to cool from its thermal shutdown temperature $T_{TSD}$, to its reset status temperature $T_{RS}$.

The length of the cooling time interval is essentially not a function of the load impedance or the load current that flows when the driver is in an ON state. The cooling time interval must be long enough for enough of the heat energy stored in the mass of the MOS/FET at shutdown temperature $T_{TSD}$, to be transferred to the ambient environment that the MOS/FET temperature falls to the thermal reset of status temperature $T_{RS}$. The time for sufficient heat transfer may be called the heat dissipation time. The temperature of the MOS/FETs is a function of (1) the electrical power dissipated as heat in the MOS/FET resistance $R_{DS}$ as a result of load current, and (2) the rate at which that heat is transferred to the ambient environment. However, when the MOS/FETs are turned OFF, no electrical energy is dissipated in them.

The temperature of the MOS/FETs is essentially the same TTSD each time the external control circuit turns the driver OFF from overheating. For each particular model of switching module that uses a high side driver, the mass in which the heat energy is stored at this temperature is also the same. Therefore, for each particular model of switching module, the heat energy that must be dissipated to the ambient environment is the same finite quantity of heat energy.

Therefore, the heat dissipation time is a function of the thermal resistance of the heat flow path to the ambient environment and the temperature differential between the MOS/FET and the ambient environment. The ambient temperature of the environment in which the driver is housed can vary widely between tropical and arctic regions and as a function of other heat generating equipment being located in close proximity and ventilation. The thermal resistance of the flow path is not affected by electrical operation but is a function of the package and heat sink structures. These structures will be different for each driver and for each switching module in which it is used but they do not change once being manufactured. Therefore, each driver and each model of switching module will have its own heat dissipation time which is independent of operating current. Consequently, the heat dissipation time required for the sensed temperature of the MOS/FETs, while in an OFF state, to cool from the thermal shutdown temperature $T_{TSD}$, to the reset status temperature $T_{RS}$ is, for each particular model, essentially a function of the ambient temperature of the switching module.

This allows the minimum length of the cooling time interval to be determined empirically from experimentation. The experiments are preferably performed at the highest ambient temperature which is expected to be encountered in applications of the model of switching module being tested. Under this experimental condition, a switching module of a particular design is experimentally operated at a plurality of different cooling time intervals. Preferably, a first cooling time on the order of 1 millisecond is stored in the external control circuit and the circuit is operated to determine whether, after the cooling time interval, the driver applies a current pulse at the higher current limit $I_{LIMH}$ or at the lower current limit $I_{LIML}$. If the driver turns ON at the lower current limit $I_{LIML}$, then a longer cooling time interval is stored and the procedure is repeated. The procedure is repeated by storing progressively longer selected cooling time intervals until the shortest cooling time interval is found after which the driver is turned on at its higher current limit $I_{LIMH}$. That last cooling time interval is the heat dissipation time and becomes the minimum cooling time interval for the particular switching module.

However, because there is a variation in the characteristics of every solid state device from it nominal characteristics, and because it is good engineering practice to provide a safety factor, it is desirable to provide a cooling time interval that is longer than the heat dissipation time. I have found that the cooling time interval that should be stored in the external control circuit of the switching module is at least three times the experimentally measured heat dissipation time.

I have found that, for practical applications that I have designed, the OFF command at the control input of the high side driver is desirably maintained for a selected cooling time interval that is longer than its ON time and is within the range of 1 millisecond to 20 milliseconds. For some designs and applications the cooling time interval may be more, but, more commonly, the OFF command at the control input of the high side driver should be maintained for a selected cooling time interval that is within the range of 3 milliseconds to 8 milliseconds.

Figure 5:
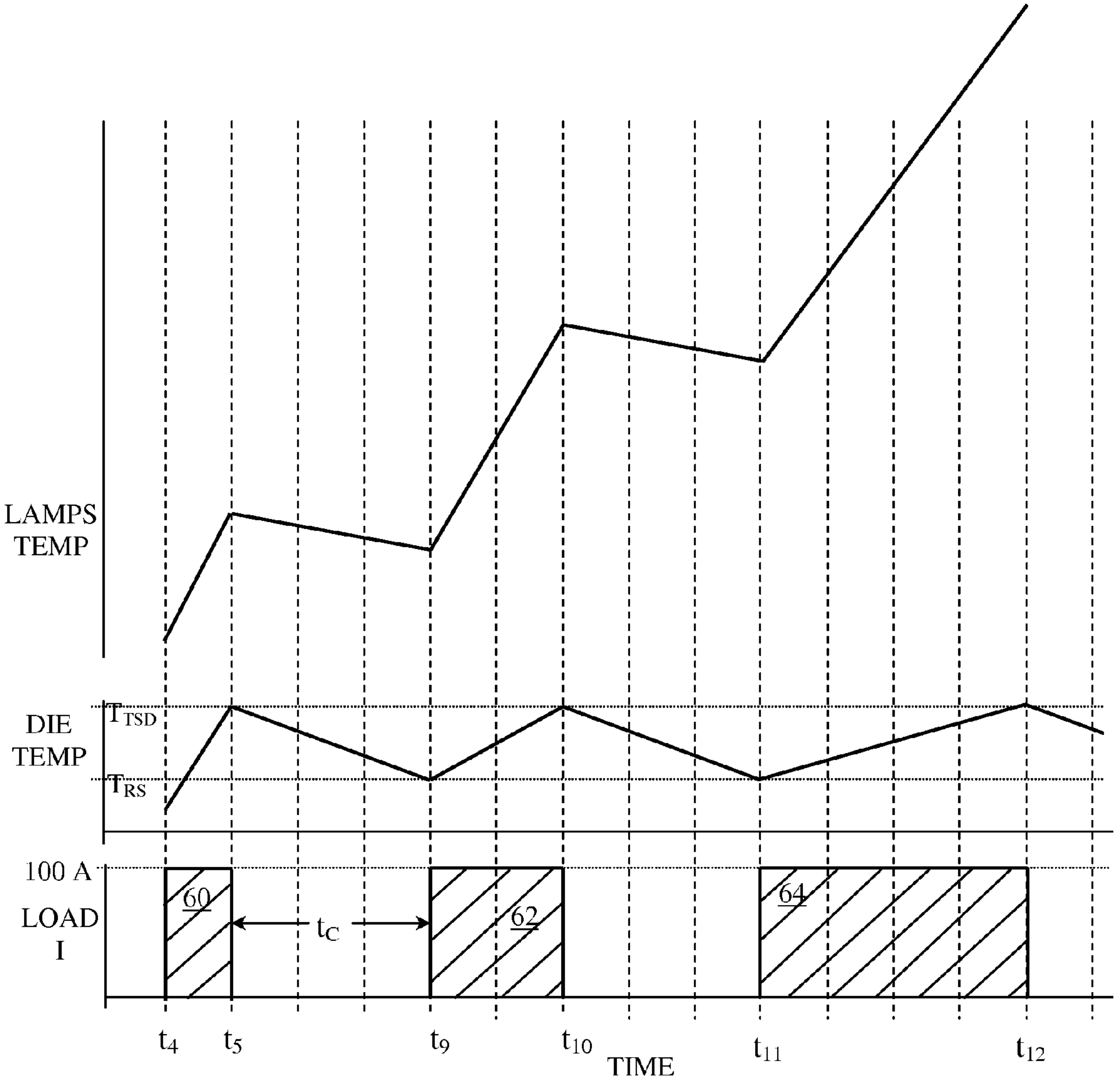
FIG. 5 is an associated set of oscillograms illustrating the operation of the preferred embodiment of the invention.

FIG. 5 illustrates the operation the invention. The current pulse 60 corresponds to the current pulse in FIG. 3 between times $t_4$ and $t_5$ and is at the maximum current limit $I_{LIMH}$. That current pulse 60 results in the lamp temperature increasing and the MOS/FET temperature rising to the shutdown temperature $T_{TSD}$. At time $t_5$ the high side driver turns OFF from the overtemperature, that change of the output state to OFF is sensed by the external control circuit, an OFF command is applied to the high side driver and a cooling time interval $t_c$ is initiated. At time $t_9$ the cooling time interval $t_c$ ends, an ON command is applied to the control input of the driver, and the current pulse 62 begins to flow through the load. After another cooling time interval, a third pulse 64 flows through the load. Critically important is that the second and subsequent pulses are at the high current limit $I_{LIMH}$. One important result of the high current of the second and subsequent pulses is that the higher current pulses apply more heating power to the incandescent load to heat it. Another important result is that, because the source-drain resistance less than would be necessary to limit the current to the low current limit $I_{LIML}$, less heat is dissipated in the MOS/FET. The cumulative effect is more heating power is coupled into the load at the higher current $I_{LIMH}$ than can be coupled to the load at the lower current limit $I_{LIML}$ and therefore the lamps become fully lighted more rapidly.

The fact that more power is coupled into the load can also be appreciated by considering the well known principle that the maximum power is transferred from a source to a load when the source and the load have the same impedance. The incandescent lamps have a very low resistance and therefore a very high inrush current during their critical start up. As previously stated, in order for the MOS/FETs to limit the current to a fixed current limit, the less the resistance of the load, the greater must be the drain-source resistance $R_{DS}$. Therefore, during the start up of an incandescent lamp load that, in the absence of current limiting, would have an inrush current several multiples of the current limit of the MOS/FETs, any reduction of the drain-source resistance $R_{DS}$ would bring the impedance of the source and the impedance of the load nearer to equality. By controlling the high side driver so that all the current pulses are at the high current limit $I_{LIMH}$, the invention operates the MOS/FETs at the least possible drain-source resistance $R_{DS}$.

Returning to FIG. 5, as the incandescent lamps are heated, their resistance increases and therefore the drain-source resistance $R_{DS}$ can be reduced further to still maintain the current limiting. The reduction in the drain-source resistance means that the current pulses become successively longer because less heat is dissipated in the MOS/FETs so they can remain conducting longer before they reach the shut down temperature $T_{TSD}$. Because the successively longer pulses are not only longer but are at the higher current limit $I_{LIMH}$, the heating of the lamps is accelerated. This can intuitively be observed by comparing the area under the load current pulses in FIG. 3 between $t_4$ and $t_8$ to the area under the load current pulses in FIG. 5. The area under the current pulses is proportional to the power applied to the incandescent load.

Figure 6:
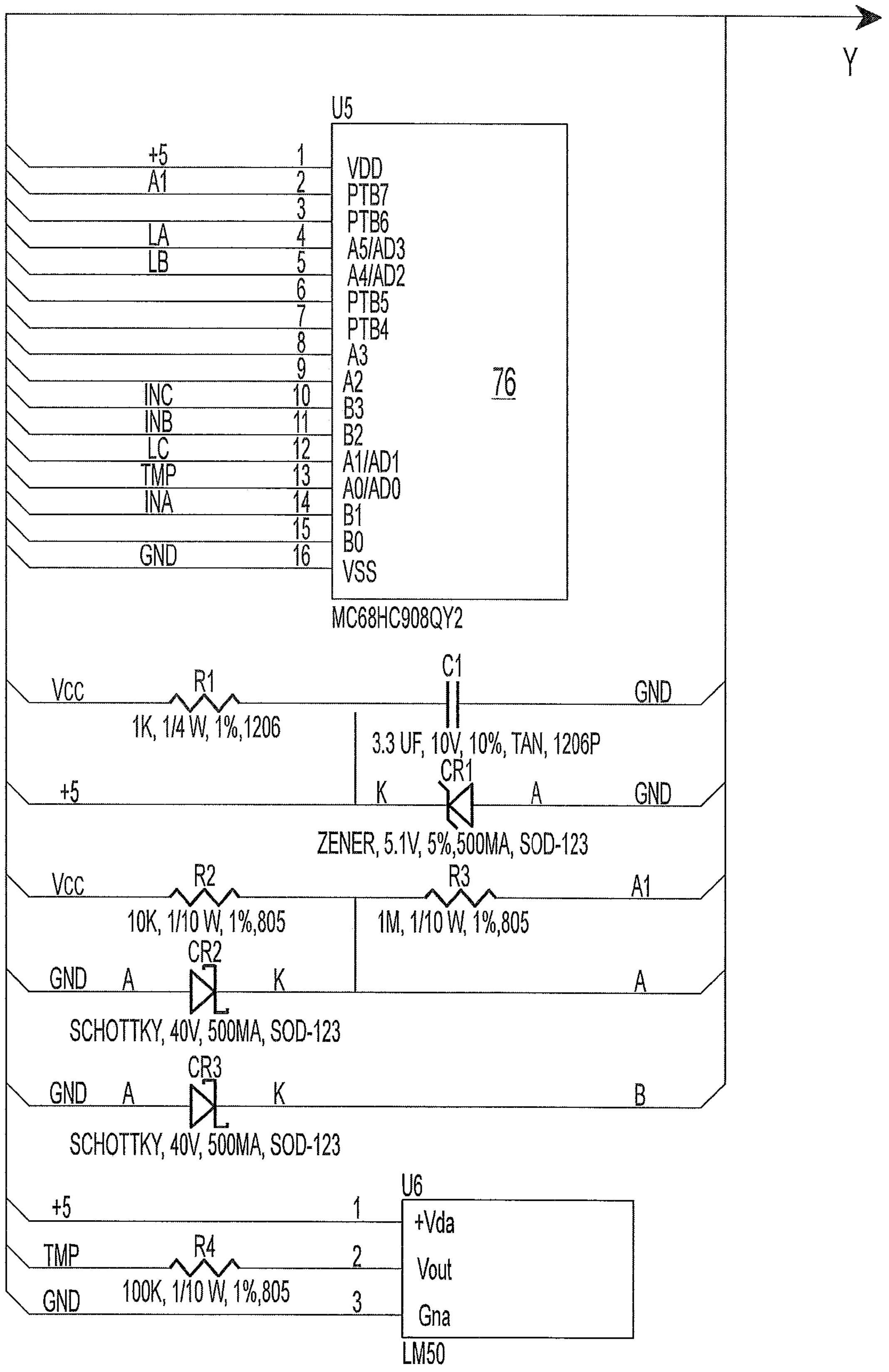
FIG. 6 is a portion of a schematic diagram of the preferred embodiment of the invention.
Figure 7:
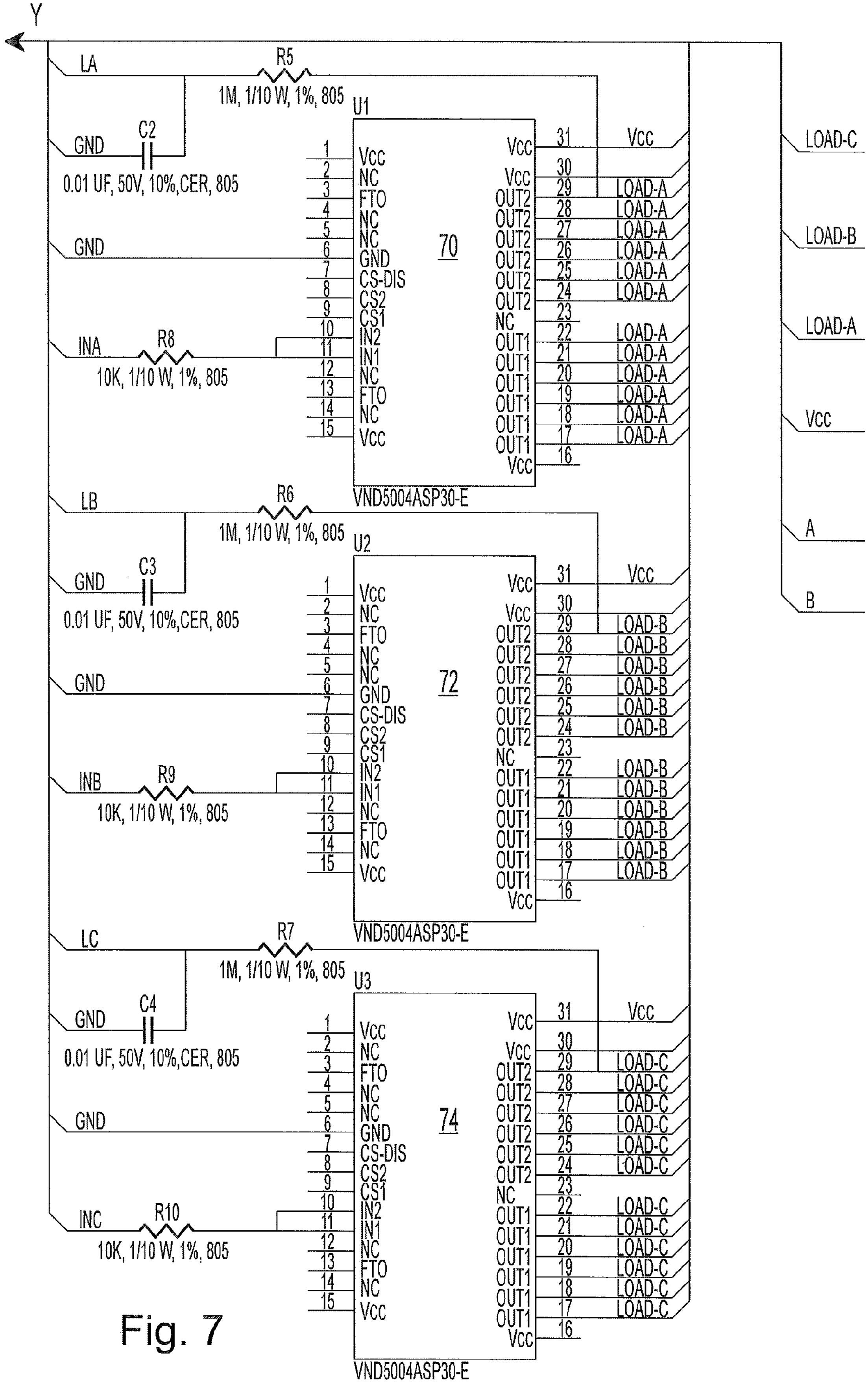
FIG. 7 is a remaining portion of the schematic diagram of the preferred embodiment of the invention and joins to FIG. 6.

FIGS. 6 and 7 together are a detailed schematic diagram of a switching module that is the preferred embodiment of the invention. The circuits shown on FIGS. 6 and 7 are joined at Y. The control logic is a MC908QY2 microcontroller 76 for the external control system. The microcontroller 76 has outputs connected to the control inputs of three, VND5004A-E high side drivers 70, 72 and 74. The following is the stored program for operating it according to the invention.

The invention has been described in connection with the VND5004 family of high side drivers but another example of its application is to the VND920 family of high side drivers and relays. By "family" is meant variations which carry the same identification to designate the basic type of device but typically have additional alphanumeric characters to distinguish the family members from each other. The invention is also applicable to other devices which may have different alphanumeric identifications but have the same or only insubstantially different electrical properties.

Program for a MC908QY2 Microprocessor in External Control Circuit

```
* Ambulance Flasher 4860GCPE using MC908QY2 04/25/07 REV A
***********************************************
* 1 VND5004 with output short and overload detection with modulation and
timeout
* 2 Over-temperature pulse width modulation 180 F. = 69 AD bits out of 256
bits
* 3 Production started with Lot - no production
***********************************************
***********************************************
* Port A Definitions
* PA0 AD Temperature            PTA0/AD0/TCH0/KBI0
* PA1 IN C1 INPUT               PTA1/AD1/TCH1/KBI1
* PA2 IN Not Used               PTA2/IRQ/KBI2
* PA3 IN Not Used               PTA3/RST/KBI3
* PA4 IN B1 INPUT               PTA4/AD2/OSC2/KBI4
* PA5 IN A1 INPUT               PTA5/AD3/OSC1/KBI5

* Port B Definitions
* PB0 IN Not Used
* PB1 OUT Channel A
* PB2 OUT Channel B
* PB3 OUT Channel C
* PB4 IN Not Used
* PB5 IN Not Used
* PB6 IN Not Used
* PB7 IN Secondary Input Sense

    ORG $0080
TCOUNT    DS 1          ; 3.125 MSEC per bit time base- overal period
is 800 msec
FLAG      DS 1          ; Control FLAG - one bit for each output
TEMP      DS 2          ; Temperature integration register 16 bit
OTEMP     DS 1          ; Over Temperature turn off cound bias
CycleA    DS 2          ; Overload cycle downcounter
CycleB    DS 2          ; Overload cycle downcounter
CycleC    DS 2          ; Overload cycle downcounter

    ORG   $FFBE         ; Block protect all FLASH memory
    DB    $00

    ORG   $F800         ; USER MEMORY F800 - FDFF 1536 BYTES

RESET RSP               ; Reset Stack Pointer
    STA   COPCTL

*Branch to RESTART for any reset other than LVI and POR
    LDA   SRSR
    AND   #%10000010
    BEQ   RESTART

* Preset data registers
    CLR   PORTB
    CLR   TCOUNT
    CLR   OTEMP
    CLR   TEMP
    CLR   TEMP+1
    MOV   #3T,CycleA
    MOV   #255T,CycleA+1
    MOV   #3T,CycleB
    MOV   #255T,CycleB+1
    MOV   #3T,CycleC
    MOV   #255T,CycleC+1
```

-continued

```
        MOV     #%00001110,FLAG
        MOV     #%00001110,DDRB

    *Set timer interrupt for 3.125 msec
    RESTART LDA TSC            ; Reading the TCS is required before TIM
Overflow FlagBit (TOF) can be cleared
        MOV     #$50,TSC   ; Reset TIM counter and prescaler, Clear TOF
if set and
                           ; Set TIM Overflow Interrupt Enable Bit (TOIE)
        MOV     #39T,TMODH         ; Set TIM Modulo High
        MOV     #16T,TMODL         ; Set TTM Modulo Low


    *Start of main program loop - clear all unused registers and enter a wait state
for next timer interrupt
    Start RSP
        MOV     #$1F,ADSCR         ; Put ADC in low power mode
        LDA     $FFC0                 ; Load factory programed oscillator trim
calibration
        STA     OSCTRIM          ; Store calibration in oscillator trim register
        CLR     KBSCR
        CLR     KBIER
        CLR     INTSCR
        CLR     TSC0
        CLR     TSC1
        LDA     #$00
        STA     BSR
        STA     BFCR
        STA     FLCR
        STA     FLBPR
        STA     BRKSCR
        STA     COPCTL         ; Cop reset
        WAIT                ; Clear Interrupt Mask and wait for next Timer
Interrupt
        SEI                    ; Set Interrupt Mask - this disables interrupts
including a Timer interrupt

    * Update Temperature measurement using the following filter program of
adding new reading to the sum of measurements
    * and then subtracting their average from the sum.
    TEMP0 MOV #$00,ADSCR           ; Start AD conversion on PTA0
        BRCLR   7,ADSCR,*      ; Wait for conversion complete
        MOV     #$00,ADSCR     ; Start AD conversion on PTA0
        BRCLR   7,ADSCR,*      ; Wait for conversion complete

    * Add the new measurement to the sum of measurements found in bytes TEMP
and TEMP+1
        CLC             ; Clear carry
        LDA     ADR         ; Load A with current temperature
        ADD     TEMP            ; Add new value to least significant word
TEMP
        STA     TEMP        ; Store sum in least significant word
        CLRA            ; Clear A
        ADC     TEMP+1          ; Add most significant word TEMP+1 and
carry bit if any
        STA     TEMP+1     ; Store result in most significant word

    * Subtract the (sum of the measurements / 256 ) from the two byte sum of
measurements
        CLC             ; Clear carry
        LDA     TEMP            ; Load A with the lease significant byte of the
sum of measurements
        SUB     TEMP+1                ; Subtract the total of the last 256
measurements divided by 256
        STA     TEMP        ; Store result in lease significant byte
        LDA     TEMP+1          ; Load A with most significate byte
        SBC     #0T    ; Subtract carry bit if any
        STA     TEMP+1          ; Store result. TEMP+1 is the average of
measurements

    * Increment the OTEMP offset register when the measured temperature
exceeds the limit value else decrease the register.
    * Register limits are 0 and 100.
        LDA     TCOUNT          ; Do this at 31.25 msec
        CMP     #10T
        BNE     TEMP4
```

-continued

```
        LDA     TEMP+1          ; Load A with temperature
        CMP     #69T       ; Compare it to 180F
        BLO     TEMP2           ; If lower branch to decrement OTEMP else
increment OTEMP

    TEMP 1 LDA OTEMP                ; Increment OTEMP if < 100
        CMP     #100T
        BHI     TEMP3
        INC     OTEMP
        BRA     TEMP4

    TEMP2 LDA OTEMP                 ; Decrement OTEMP if > 0
        CMP     #0T
        BEQ     TEMP4
    TEMP3 DEC OTEMP
    TEMP4 NOP


    * Output Logic
    ON1 LDA TCOUNT                  ; Do this at 0 msec
        CMP     #0T
        BNE     ON2
        BCLR    1,PORTB         ; Turn Output-A OFF
        BRCLR   2,FLAG,ON1A         ; Bypass if FLAG bit is clear
        BSET    2,DDRB
        BSET    2,PORTB         ; Turn Output-B ON
    ON1A BRCLR 7,PORTB,ON1B          ; Bypass if in Secondary Mode
        BRCLR   3,FLAG,ON1B         ; Bypass if FLAG bit is clear
        BSET    3,DDRB
        BSET    3,PORTB         ; Turn Output-C ON
    ON1B JMP START

    ON2 LDA TCOUNT                  ; Do this at 400 msec
        CMP     #128T
        BNE     OTOFF
        BCLR    2,PORTB         ; Turn Output-B OFF
        BCLR    3,PORTB         ; Turn Output-C OFF
        BRCLR   1,FLAG,ON2A         ; Bypass if FLAG bit is clear
        BSET    1,DDRB
        BSET    1,PORTB         ; Turn Output-A ON
    ON2A JMP START

    * Reduce the ON time when the measured temperature exceeds the defined
level. The OTEMP register can contain
    * a value between 0 and 100. When the measured temperature exceeds the
defined value, this register is slowly
    * incremented towards 100 thereby reduceing the conduction time of the
output intern reduceing the temperature
    * else it its decremented toward 0.

    OTOFF LDA TCOUNT                    ; Load current TCOUNT value
        AND     #%01111111              ;Mask out bit 128
        ADD     OTEMP               ; Add OTEMP offset
        CMP     #128T           ; if result equals 128 then clear PORTB
        BNE     OTOFF1
        CLR     PORTB
    OTOFF1 NOP

    * Cycle output device if an overload has caused the output device to trip off.
    * If device trips for the defined nymber of cycles then set its' FLAG bit inturn
locking output off.
    T0  BRCLR   1,DDRB,T1
        BRCLR   1,PORTB,T1
        BRSET   5,PORTA,T1
        BCLR    1,DDRB
        DBNZ    CycleA+1,T2
        DBNZ    CycleA,T2
        BCLR    1,FLAG
        BRA     T2
    T1  BSET    1,DDRB

    T2  BRCLR   2,DDRB,T3
        BRCLR   2,PORTB,T3
        BRSET   4,PORTA,T3
        BCLR    2,DDRB
        DBNZ    CycleB+1,T4
        DBNZ    Cycleb,T4
```

-continued

```
        BCLR    2,FLAG
        BRA     T4
    T3  BSET    2,DDRB

    T4  BRCLR   3,DDRB,T5
        BRCLR   3,PORTB,T5
        BRSET   1,PORTA,T5
        BCLR    3,DDRB
        DBNZ    CycleC+1,T6
        DBNZ    CycleC,T6
        BCLR    3,FLAG
        BRA     T6
    T5  BSET    3,DDRB
    T6  NOP

    * Loop back to Start
    Loop JMP Start

    * Return from any spurious or random interrupt
    DUMMY RTI

    * Timmer Interrupt Subroutine - 3.125 msec interval - TCOUNT range = 800
msec
    TIME LDA TSC                        ; Load TCS - required to allow a TOF reset
        MOV     #39T,TMODH                ; Set TIM Modulo High
        MOV     #16T,TMODL                ; Set TIM Modulo Low
        MOV     #$50,TSC                ; Clear TOF and set TIM Overflow Interrupt
Enable Bit and reset the TTM counter
                                ; and TIM prescaler

        INC     TCOUNT
    TIME1 RTI

    ***********************************************
    * Interrupt Vectors
    ***********************************************
        ORG     $FFDE
        dw DUMMY    ; ADC Conversion Complete Vector
        dw DUMMY    ; Keyboard Vector
        dw DUMMY    ; (No Vector Assigned $FFE2-$FFE3)
        dw DUMMY    ; (No Vector Assigned $FFE4-$FFE5)
        dw DUMMY    ; (No Vector Assigned $FFE6-$FFE7)
        dw DUMMY    ; (No Vector Assigned $FFE8-$FFE9)
        dw DUMMY    ; (No Vector Assigned $FFEA-$FFEB)
        dw DUMMY    ; (No Vector Assigned $FFEC-$FFED)
        dw DUMMY    ; (No Vector Assigned $FFEE-$FFEF)
        dw DUMMY    ; (No Vector Assigned $FFF0-$FFF1)
        dw TIME     ; TIM 1 Overflow Vector
        dw DUMMY    ; TIM 1 Channel 1 Vector
        dw DUMMY    ; TIM 1 Channel 0 Vector
        dw DUMMY    ; (No Vector Assigned $FFF8-$FFF9)
        dw RESET    ; IRQ1
        dw RESET    ; SWI Vector
        dw RESET    ; Reset Vector


    PORTA EQU $0000 ; Port A Data Reg
    PORTB EQU $0001 ; Port B Data Reg

    DDRA EQU $0004 ; Port A Direction Reg
    DDRB EQU $0005 ; Port B Direction Reg

    PTAPUE EQU $000B ; Port A Pullup Enable
    PTBPUE EQU $000C ; Port B Pullup Enable

    KBSCR EQU $001A ; Keyboard Status Control Reg
    KBIER EQU $001B ; Keyboard Int Enable Reg

    INTSCR EQU $001D ; IRQ Status Reg

    CONFIG2 EQU $001E ; System configuration register
    CONFIG1 EQU $001F; System configuration register

    TSC EQU $0020 ; Timer Status and Control Reg
    TCNTH EQU $0021; TIM Counter Reg High
    TCNTL EQU $0022 ; TIM Counter Reg Low
    TMODH EQU $0023 ; TIM Counter Modulo Reg High
    TMODL EQU $0024 ; TIM Counter Modulo Reg Low
    TSC0 EQU $0025 ; TIM Ch 0 Status and Control Reg
```

-continued

```
TCH0H EQU $0026 ; TIM Ch 0 Reg High
TCH0L EQU $0027 ; TIM Ch 0 Reg Low
TSC1 EQU $0028 ; TIM Ch 1 Status and Control Reg
TCH1H EQU $0029 ; TIM Ch 1 Reg High
TCH1L EQU $002A ; TIM Ch 1 Reg Low

OSCSTAT EQU $0036 ; OSCILLATOR STATUS REG
OSCTRIM EQU $0038 ; OSCILLATOR TRIM

ADSCR EQU $003C ; ADC Status Control Reg

ADR EQU $003E ; ADC Data Reg
ADICLK EQU $003F ; ADC Clock Reg

BSR EQU $FE00 ; Break Status Reg
SRSR EQU $FE01 ; SIM Reset Status Reg
BRKAR EQU $FE02 ; BREAK AUXILLARY
BFCR EQU $FE03 ; Break Flag Control Reg

INT1 EQU $FE04 ; INT Status Reg 1
INT2 EQU $FE05 ; INT Status Reg 2
INT3 EQU $FE06 ; INT Status Reg 3

FLCR EQU $FE08 ; Flash Control Reg
BRKH EQU $FE09 ; Break Address Reg High
BRKL EQU $FE0A ; Break Address Reg Low
BRKSCR EQU $FE0B ; Break Status Control Reg

LVISR EQU $FE0C ; LVI STATUS REGISTER

FLBPR EQU $FFBE ; BLOCK PROTECT REGISTER

COPCTL EQU $FFFF ; COP Control Reg
```

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A method for controlling a solid state, smart, high side driver for controlling the application of electrical power from a DC electrical source to a load when the load has a transient characteristic that the load increases in electrical impedance following the application of power to the load, the high side driver having overcurrent and driver temperature sensing and protection circuits, a control input terminal for applying an ON state or an OFF state command to the high side driver and a power output terminal for connection to the electrical load, the method comprising:

(a) sensing the output terminal of the high side driver for detecting that the high side driver has turned to an OFF state; and (b) in response to the coexistence of an ON command applied to the control input of the high side driver and the output terminal of the high side driver switching to an OFF state, applying an OFF command to the control input of the high side driver, maintaining the OFF command at the control input of the high side driver for a selected cooling time interval, and applying an ON command to the control input of the high side driver after the selected cooling time interval.

2. A method in accordance with claim 1, wherein the high side driver has programmed logic that, in response to an ON command continuously applied to its control input, switches the driver to an ON state at a higher current limit $I_{LIMH}$ if the driver's sensed temperature does not exceed a lower, reset status temperature $T_{RS}$, switches the driver to an OFF state if its sensed temperature exceeds a thermal shutdown temperature $T_{TSD}$, and switches the driver to an ON state at a lower current limit $I_{LIML}$, if its temperature falls from the thermal shutdown temperature $T_{TSD}$ to an intermediate temperature $T_R$ and wherein the method further comprises: maintaining the OFF command at the control input of the high side driver for a selected cooling time interval that is at least as long as a heat dissipation time required for the sensed temperature of the driver, while in an OFF state, to cool from its thermal shutdown temperature $T_{TSD}$ to its reset status temperature $T_{RS}$.

3. A method in accordance with claim 2, wherein the selected cooling time interval is selected by first experimentally measuring a heat dissipation time required for the sensed temperature of the driver, while in an OFF state, to cool from a thermal shutdown temperature $T_{TSD}$ to a reset status temperature $T_{RS}$, the heat dissipation time being measured by applying progressively longer selected cooling time intervals until the shortest cooling time interval is found after which the driver can be turned on at its higher current limit $I_{LIMH}$.

4. A method in accordance with claim 3, wherein the OFF command at the control input of the high side driver is maintained for a selected cooling time interval that is at least 3 times the experimentally measured heat dissipation time.

5. A method in accordance with claim 3, wherein the OFF command at the control input of the high side driver is maintained for a selected cooling time interval that is within the range of 3 milliseconds to 8 milliseconds.

6. A method in accordance with claim 1, wherein the OFF command at the control input of the high side driver is maintained for a selected cooling time interval that is within the range of 1 millisecond to 20 milliseconds.

7. An electronic switch for controlling the application of electrical power from a DC electrical source to a load, the load having a transient characteristic that the load increases in electrical resistance following the application of power to the load, the electronic switch comprising:

(a) a solid state, smart, high side driver having overcurrent and driver temperature sensing and protection circuits, a control input terminal for applying an ON state command or an OFF state command and a power output terminal for connection to the electrical load, the high side driver including an internal control circuit having stored instructions causing the driver (i) in response to an ON command continuously applied to its control input, to switch to an ON state at a higher current limit $I_{LIMH}$ if the driver's sensed temperature does not exceed a lower, reset status temperature $T_{RS}$, (ii) in the absence of an OFF command, to protectively switch to an OFF state if its sensed temperature exceeds a thermal shutdown temperature $T_{TSD}$, and (iii) in the absence of an OFF command, to switch to an ON state at a lower current limit $I_{LIML}$ if its temperature falls from the thermal shutdown temperature $T_{TSD}$ to an intermediate reset temperature $T_R$; and (b) a solid state, digital logic, controller externally of the high side driver and having at least one external control input for application of an OFF command or an ON command, an output connected to the control input of the high side driver and an input connected to the power output terminal of the high side driver for sensing the ON and OFF state of the output of the high side driver, the external digital controller having stored instructions causing the external controller, in the absence of an OFF command at the external control input, (i) to apply an OFF command to the input terminal of the high side driver in response to sensing that the high side driver has turned to an OFF state while an ON command was applied at the control input of the high side driver, (ii) to maintain the OFF command at the input terminal of the high side driver for a selected cooling time interval, and (iii) to apply an ON command to the input terminal of the high side driver after the selected time interval.

8. An electronic switch in accordance with claim 7, wherein the high side driver has programmed logic that, in response to an ON command continuously applied to its control input, switches the driver to an ON state at a higher current limit $I_{LIMH}$ if the driver's sensed temperature does not exceed a lower, reset status temperature $T_{RS}$, switches the driver to an OFF state if its sensed temperature exceeds a thermal shutdown temperature $T_{TSD}$, and switches the driver to an ON state at a lower current limit $I_{LIML}$ if its temperature falls from the thermal shutdown temperature $T_{TSD}$ to an intermediate temperature $T_R$ and wherein the external controller has a stored selected cooling time interval that is at least as long as a heat dissipation time required for the sensed temperature of the driver, while in an OFF state, to cool from its thermal shutdown temperature $T_{TSD}$ to its reset status temperature $T_{RS}$.

9. An electronic switch in accordance with claim 8, wherein the stored selected cooling time interval is at least 3 times the heat dissipation time.

10. An electronic switch in accordance with claim 7, wherein the solid state, digital logic, control circuit has a stored, selected cooling time interval that is within the range of 1 millisecond to 20 milliseconds.

11. An electronic switch in accordance with claim 10, wherein the solid state, digital logic, control circuit has a stored, selected cooling time interval that is within the range of 3 milliseconds to 8 milliseconds.

12. An electronic switch in accordance with claim 7 wherein the load includes incandescent lamps.

13. An electronic switch in accordance with claim 12 wherein the high side driver is a member of the VND5004 family.

14. An electronic switch in accordance with claim 12 wherein the high side driver is a member of the VND920 family.

* * * * *